United States Patent
Strongin et al.

(10) Patent No.: US 6,560,688 B1
(45) Date of Patent: May 6, 2003

(54) SYSTEM AND METHOD FOR IMPROVING ACCELERATED GRAPHICS PORT SYSTEMS

(75) Inventors: Geoffrey Scott Sidney Strongin, Austin, TX (US); Qadeer Ahmad Qureshi, Round Rock, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/164,799

(22) Filed: Oct. 1, 1998

(51) Int. Cl.$^7$ ............................. G06F 12/00; G06F 9/26
(52) U.S. Cl. ...................... 711/203; 711/206; 345/568
(58) Field of Search .................. 711/202–207; 345/511–513, 516, 517, 568

(56) References Cited

U.S. PATENT DOCUMENTS

| | | | | |
|---|---|---|---|---|
| 5,282,274 A | * | 1/1994 | Liu | 711/206 |
| 5,987,582 A | * | 11/1999 | Devic | 711/206 |
| 6,065,091 A | * | 5/2000 | Green | 711/3 |
| 6,069,638 A | * | 5/2000 | Porterfield | 345/516 |
| 6,073,226 A | * | 6/2000 | Cutshall et al. | 711/202 |
| 6,088,780 A | * | 7/2000 | Yamada et al. | 711/204 |
| 6,145,064 A | * | 11/2000 | Long et al. | 709/103 |

OTHER PUBLICATIONS

Intel Corporation, *Accelerated Graphics Port Interface Specification*, Revision 1.0 (Jul. 31, 1996).

* cited by examiner

Primary Examiner—Reginald G. Bragdon
Assistant Examiner—Pierre M. Vital
(74) Attorney, Agent, or Firm—Robert C. Kowert; Meyertons, Hood, Kivlin, Kowert & Goetzel, P.C.

(57) ABSTRACT

A method and system for improving virtual memory performance, especially in the context of data processing systems utilizing the Accelerated Graphics Port (AGP) interface standard. In the method and system, a request to access a first virtual memory address, correspondent to a first physical memory location resident within a first page of physical memory, is received. In response to the request to access the first virtual memory address, a Graphics Translation Look Aside Buffer entry is created. In response to a request to access a second virtual memory address, correspondent to a second physical memory address resident within a second physical memory area non-overlapping with the first physical memory page, the second physical memory location is accessed via the Graphics Translation Look Aside Buffer entry. The Graphics Translation Look Aside Buffer entry is constructed such that it translates a number of virtual memory addresses corresponding to a number of physical memory addresses. The construction of the Graphics Translation Look Aside Buffer entry is achieved by translating the first virtual memory address to a first physical memory address, obtaining a size of a contiguous graphics physical memory block containing the first physical memory address, and associating a range of virtual memory addresses with the obtained contiguous graphics physical memory block.

28 Claims, 9 Drawing Sheets

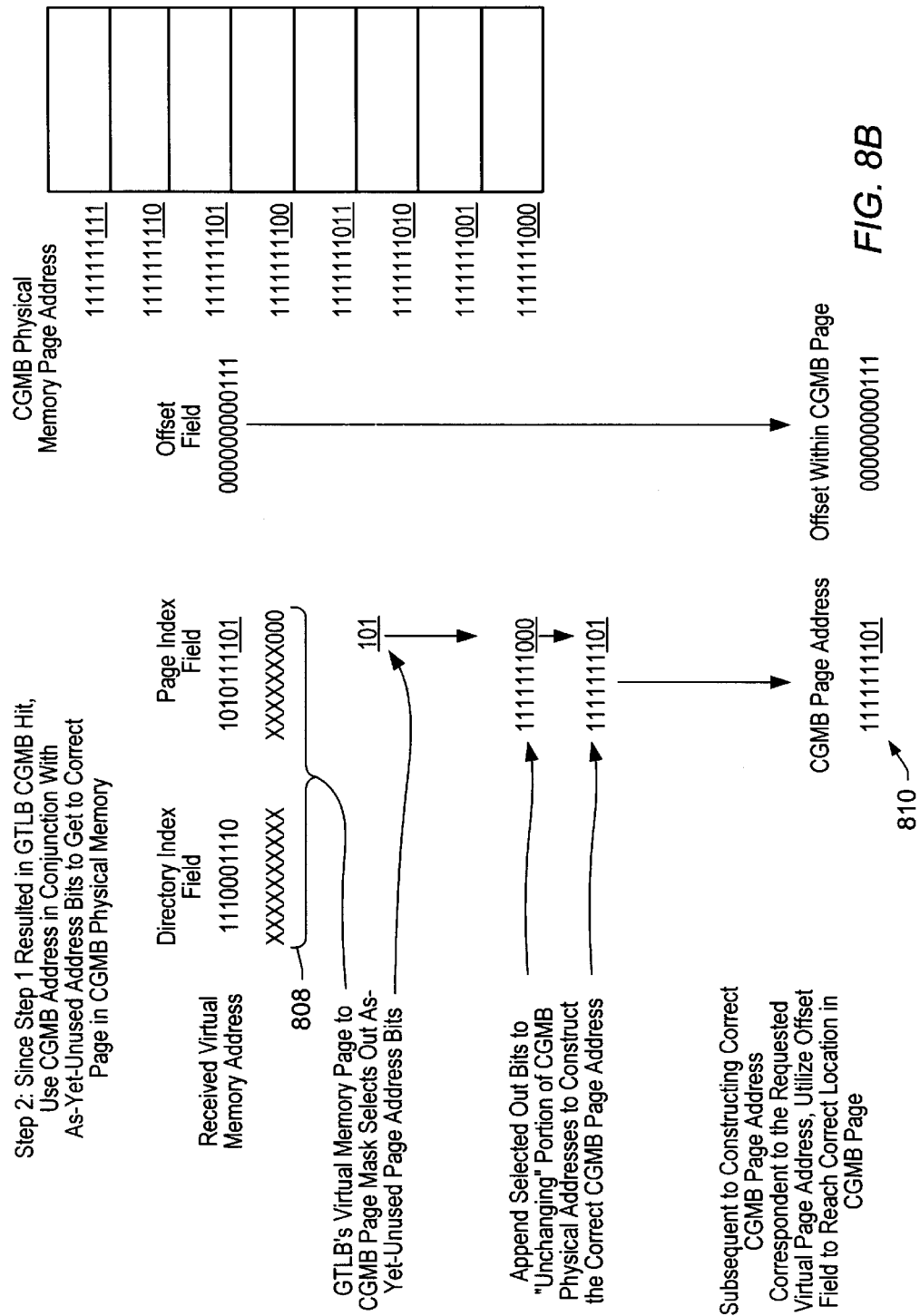

SYSTEM AND METHOD FOR IMPROVING ACCELERATED GRAPHICS PORT SYSTEMS

BACKGROUND OF THE INVENTION

1. Field of the Invention

The present invention relates, in general, to a method and system to be utilized in data processing systems. In particular, the present invention relates to a method and system to be utilized in data processing systems wherein virtual memory address to physical memory address translation is done. Yet still more particularly, the present invention relates to a method and system to be utilized in data processing systems, wherein virtual memory address to physical memory address translation is done, such as data processing systems utilizing the Accelerated Graphics Port (AGP) interface standard.

2. Description of the Related Art

Data processing systems are systems that manipulate, process, and store data and are notorious within the art. Personal computer systems, and their associated subsystems, constitute well known species of data processing systems. Personal computer systems in general and IBM compatible personal computer systems in particular have attained widespread use for providing computer power to many segments of today's modern society. A personal computer system can usually be defined as a desk top, floor standing, or portable microcomputer that includes a system unit including but not limited to a system processor and associated volatile and non-volatile memory, a display device, a keyboard, one or more diskette drives, one or more fixed disk storage devices, and one or more data buses for communications between devices. One of the distinguishing characteristics of these systems is the use of a system board to electrically connect these components together. These personal computer systems are information handling systems which are designed primarily to give independent computing power to a single user (or a relatively small group of users in the case of personal computers which serve as computer server systems) and are inexpensively priced for purchase by individuals or small businesses.

A computer system or data-processing system typically includes a system bus. Attached to the system bus are various devices that may communicate locally with each other over the system bus. For example, a typical computer system includes a system bus to which a central processing unit (CPU) is attached and over which the CPU communicates directly with a system memory that is also attached to the system bus.

In addition, the computer system may include a peripheral bus for connecting certain highly integrated peripheral components to the CPU. One such peripheral bus is known as the Peripheral Component Interconnect (PCI) bus. Under the PCI bus standard, peripheral components can directly connect to a PCI bus without the need for glue logic. Thus, PCI is designed to provide a bus standard on which high-performance peripheral devices, such as graphics devices and hard disk drives, can be coupled to the CPU, thereby permitting these high-performance peripheral devices to avoid the general access latency and the band-width constraints that would have occurred if these peripheral devices were connected to a low speed peripheral bus. Details on the PCI local bus standard can be obtained under the PCI Bus Specification, Revision 2.1, from the PCI Special Interest Group, which is hereby incorporated by reference in its entirety.

Relatively recently, techniques for rendering three-dimensional (3D) continuous-animation graphics have been implemented within PCs which, as will be explained below, have exposed limitations in the originally high performance of the PCI bus. For example, the AGP interface standard has been developed to both, (1) reduce the load on the PCI bus systems, and (2) extend the capabilities of systems to include the ability to provide 3D continuous-animation graphics with a level of quality previously found only on high-end computer workstations. The AGP interface standard is defined by the following document: Intel Corporation, *Accelerated Graphics Port Interface Specification*, Revision 1.0 (Jul. 31, 1996), which is hereby incorporated by reference in its entirety.

The AGP interface standard is specifically targeted to improve the efficiency of 3D continuous-animation graphics applications which utilize a technique know in the art as "texturing." Consequently, as background for understanding the data processing systems utilizing the AGP interface standard, it is helpful to have a brief overview of the data processing needs of 3D continuous animation graphics applications which utilize texturing, how they degrade the performance of PCI local bus systems, and how the AGP interface standard remedy this degradation of performance.

The display device of a computing system displays data in two-dimensions (2D). In order to create a 3D continuous animation graphical display, it is first necessary to create an object such that when the object is presented on the 2D display device, the object will be perceived by a human viewer as a 3D object. There are two basic ways in which this can be done. The first way is to use color and shading techniques to trick the human visual system into perceiving 3D objects on the 2D display device (essentially the same technique used by human artists when creating what appear to be 3D landscapes consisting of trees, rocks, streams, etc., on 2D canvases). This is a very powerful technique and creates superior 3D realism. The second way is to use mutually perpendicular lines (e.g., the well-known x, y, z coordinate system) to create geometric objects which will be interpreted by the human visual system as denoting 3D (essentially the same technique used by human architects to create the illusion of 3D in perspective view architectural drawings). However, the 3D illusion created by the use of mutually perpendicular lines is generally perceived to be inferior to that produced by the coloring and shading techniques.

Subsequent to creating a 3D object, the object must be animated. Animation is the creation of the illusion of continuous motion by the rapid sequential presentation of discrete images, or frames, upon the 2D display device. Animated 3D computer graphics are generated by taking advantage of a well know physiological property of the human visual system which is that if a person is shown a sequence of 15 discrete snapshots of a continuous motion, where each snapshot was taken in ⅕ second intervals, within one second, the brain will integrate the sequence together such that the person will "see," or perceive, continuous motion. However, due to person-to-person variations in physiology, it has been found empirically that a presentation of 20 images per second is generally the minimum rate at which the majority of people will perceive continuous motion without flicker, with 30 images per second tending to be the accepted as the optimal presentation speed.

The difficulty with 3D continuous animation computer graphics is that while the color and shading techniques (which are typically accomplished via bit-mapped images)

produce superior 3D realism, such techniques are not easy for a computer to translate through geometric space for the creation of continuously varying sequential images necessary to produce the animation effect. On the other hand, the geometric shapes produced via the use of mutually perpendicular lines allow for easy computer manipulation in three dimensions, which allows the creation of sequential images necessary to produce the animation effect, but such geometric shapes result in inferior 3D realism. Recent 3D continuous-animation computer graphics techniques take advantage of both of the foregoing noted 3D techniques via the use of a middle ground approach known in the art "texturing."

In the use of texturing, the gross, overall structures of an object are denoted by a 3D geometric shape which is used to do geometric translation in three space, while the finer details of each side of the 3D object are denoted by bit mapped images (known in the art as "textures") which accomplish the color and shading techniques. Each time a new image of an object is needed for animation, the geometric representation is pulled from computer memory into a CPU, and the appropriate translations calculated. Thereafter, the translated geometric representation is cached and the appropriate bit-mapped images are pulled from computer memory into the CPU and transformed as appropriate to the new geometric translations so as to give the correct appearance from the viewpoint of the display device, the new geometric position, and any lighting sources and/or other objects that may be present within the image to be presented. Thereafter, a device known as the graphics controller, which is responsible for creating and presenting frames (one complete computer screen) of data, retrieves both the translated geometric object data and transformed texture data, "paints" the surfaces of the geometric object with the texture data, and places the resultant object into frame buffer memory (a storage device local to the graphics controller wherein each individual frame is built before it is sent to the 2D display device). It is to be understood that the foregoing noted series of translations/transformations is done for each animated object to be displayed.

It is primarily the technique of texturing which has exposed the performance limitations of PCI bus systems. It has been found that when an attempt is made to implement 3D continuous-animation computer graphics application wherein texturing is utilized within PCI bus systems, the texturing data results in effective monopolization of the PCI bus by the application, unless expensive memory is added to the graphics controller. That is, texturing using the PCI bus is possible. However, due to PCI bandwidth limitations, the textures must fit into the memory directly connected to the graphics card. Since there is a direct correlation between the size of textures and the realism of the scene, quality can only be achieved by adding memory to the graphics card/controller. It was this realization that prompted the development of the AGP interface specification: with the AGP interface standard, texture size can be increased using available system memory. The AGP interface standard is intended to remedy the exposed limitations of the PCI local bus systems by providing extended capabilities to PCI bus systems for performing 3D continuous-animation computer graphics, as will become clear in the following detailed description.

The AGP interface standard dictates supported functions and interface standards for AGP-enabled devices; it does not dictate the internal device logic whereby the supported functions are to be implemented, but rather leaves the internal details to the discretion of system designers.

One of the primary extended capabilities provided by the AGP interface standard is that the AGP interface standard gives graphics applications the ability to access system memory without utilizing the PCI bus, thereby alleviating the limitations of PCI bus systems. The AGP interface standard provides a new separate pathway for data transfer between the graphics controller and memory. This pathway is also used for CPU to graphics controller data flow. The AGP interface standard also provides a re-mapping function for addresses that fall in a defined range. This capability enables graphics devices and the CPU to utilize a contiguous address range for the memory allocated by the operating system for graphics data and textures.

As mentioned, the AGP interface standard does not dictate the internal logic of AGP devices. One such device where the internal logic is not dictated is the Graphics Address Re-Mapping Table (GART) system. The GART system is to provide virtual memory address to physical memory address translation in order to allow devices such as AGP-enabled graphics controllers to treat AGP memory as if it were one contiguous area in memory, when in fact it may consist of many discontiguous areas of physical memory.

While the internal logic of the GART system is not defined under the AGP standard, it is likely that GART system will be implemented by most manufacturers as some variant of the Intel Corporation's x86 CPU Paging Mechanism, which is a 32-bit virtual to physical address translation accomplished through two levels of look up tables: one (the directory) provides a pointer to the location of the base of the appropriate page table, the other (the page table) provides a pointer to the base of a 4 kbyte contiguous physical memory location corresponding to a 4 kbyte page, from which the offset can be used to reach the desired location within the page.

Referring now to FIG. 1, shown is that in the x86 CPU Paging Mechanism the translation is accomplished as follows: (1) 32-bit Virtual Memory Linear Address 100 is decomposed into directory index field 102, page table index field 104, and byte offset field 106; (2) the upper most 10 bits of 32-bit Virtual Memory Linear Address 100 are used with directory base 101 to form directory index 103, an index into the first or Directory Level table 108 (these 10 bits select one of the 1024 4-byte page directory entries from this first level table whose base is stored in a CPU register); (3) the contents of the 4-byte page directory index include a pointer 110 to the base 112 of the level 2 or page table 114; (4) the next 10 bits (page table index field 104) of 32-bit Virtual Memory Linear Address 100 are used with page table base 112 to form page table index 116 to one of the 1024 4-byte entries in page table 114 (5) the contents of the 4-byte entry at page table index 116 includes a physical memory pointer 118 to base 120 of 4 kbyte memory page 122; and (6) the lower 12 bits 106 of 32-bit Virtual Memory Linear Address 100 are used with page base address 120 of 4 kbyte memory page 122 to form physical memory address 126, wherein is contained specific byte of data 128.

After the foregoing page table lookup has been done once for a particular 32-bit Virtual Memory Linear Address 100, the additional cycles required to read the directory and page table entries from memory are typically eliminated by caching within the CPU the referenced translation data. A special cache called a translation look aside buffer (TLB) is used for this purpose. However, design constraints on the TLB restrict the number of entries in the TLB, and thus limit the total amount of virtual memory which can be accessed without incurring the penalty of a page table walk (i.e., the term of art for the FIG. 1 process of reading the page directory and then the page table in order to translate a virtual address to a physical address). These page table walks represent processing overhead, and it is desired to minimize them.

If some variant of the x86 CPU Paging Mechanism is utilized to implement the virtual to physical address translation within the GART system, the same processing overhead represented by the page table walks will show themselves. Given the computational and memory intensive nature of 3D continuous-animation computer graphics as described above, it is important that such processing overhead be effectively minimized. It is therefore apparent that a need exists for a method and system which will substantially minimize the processing overhead associated with page table walks taken by any virtual memory address to physical memory address translation mechanism employed within the GART system.

SUMMARY OF THE INVENTION

It has been discovered that a method and system can be produced which will substantially minimize the processing overhead associated with page table walks, especially in the context of data processing systems utilizing the Accelerated Graphics Port (AGP) interface standard. In the method and system, a request to access a first virtual memory address, correspondent to a first physical memory location resident within a first page of physical memory, is received. In response to the request to access the first virtual memory address, a Graphics Translation Look Aside Buffer entry is created. In response to a request to access a second virtual memory address, correspondent to a second physical memory address resident within a second physical memory area non-overlapping with the first physical memory page, the second physical memory location is accessed via the Graphics Translation Look Aside Buffer entry. The Graphics Translation Look Aside Buffer entry is constructed such that it a translates a number of virtual memory addresses corresponding to a number of physical memory addresses. The construction of the Graphics Translation Look Aside Buffer entry is achieved by translating the first virtual memory address to a first physical memory address, obtaining a size of a contiguous graphics physical memory block containing the first physical memory address, and associating a range of virtual memory addresses with the obtained contiguous graphics physical memory block.

The foregoing summary is illustrative and is intended to be in no way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

FIGS. 8A and 8B illustrate, via example, how a second embodiment utilizes a GTLB entry to translate virtual addresses to physical addresses.

The use of the same reference symbols in different drawings indicates similar or identical items.

DETAILED DESCRIPTION

The following sets forth a detailed description of the best contemplated mode for carrying out the invention. The description is intended to be illustrative and should not be taken to be limiting.

Figure 2:
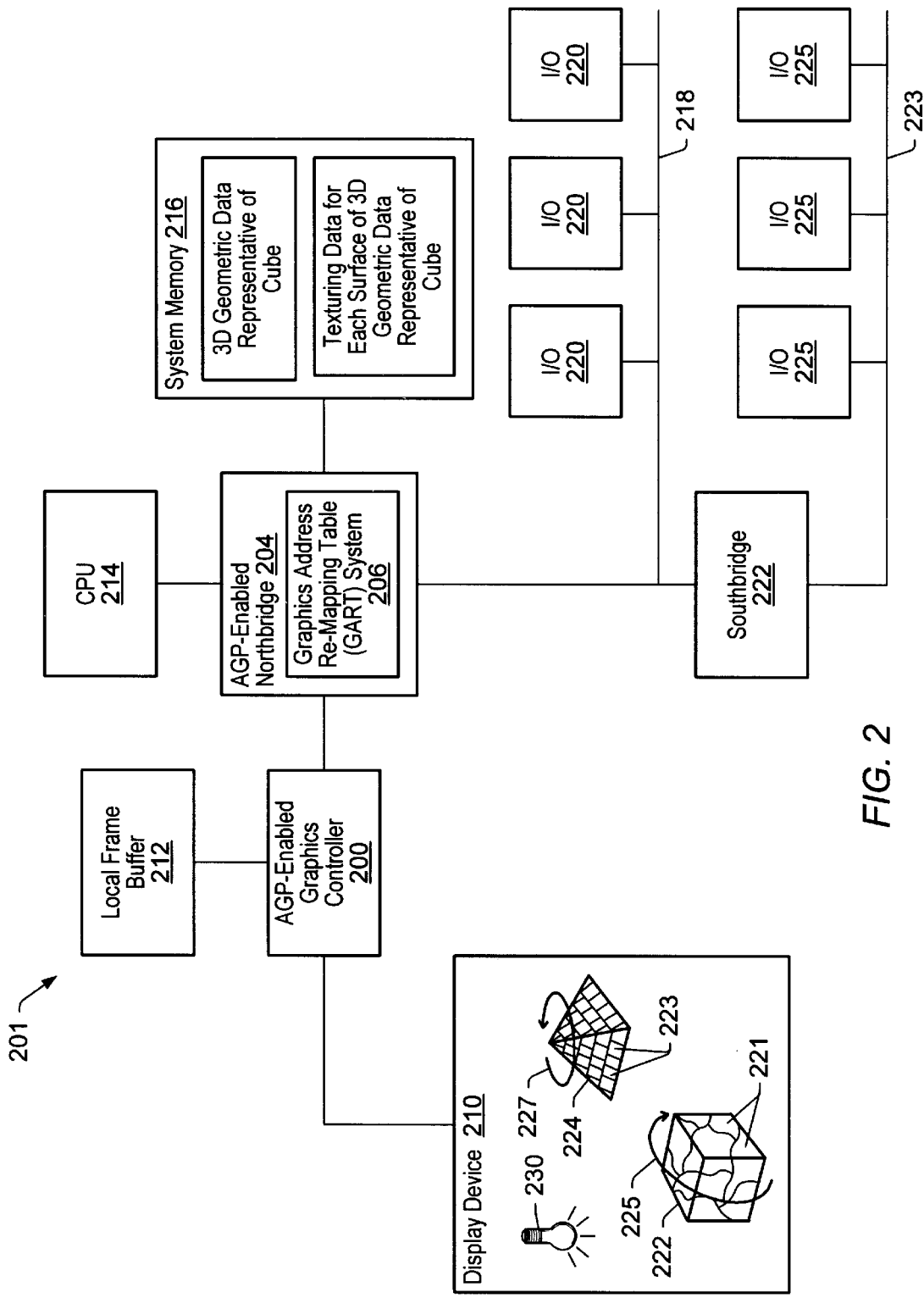
FIG. 2 shows a high-level component diagram depicting a related art AGP-enabled data processing system.

Referring now to FIG. 2, shown is high-level component diagram depicting an AGP-enabled data processing system 201 which will be utilized to show, in broad overview, how the use of texturing to create 3D continuous-animation produces data bottlenecking in non-AGP systems, and how AGP-enabled systems alleviate such data bottlenecking as well as give extended capabilities. Shown are three building blocks of AGP: AGP-enabled graphics controller 200, AGP interconnect 202 (a data bus), and an AGP-enabled Northbridge 204 (wherein is depicted Graphics Address Resolution Table (GART) system 206). Not shown, but deemed present is a fourth building block of AGP: an AGP-enabled operating system. The term AGP-enabled is intended to mean that the so-referenced components are engineered such that they interface and function under the standards defined within the AGP interface specification, referenced above. Further depicted are display device 210, local frame buffer 212, Central Processing Unit (CPU) 214, system memory 216, Peripheral Component Interconnect (PCI) bus 218, various Input-Output (I/O) devices 220, Southbridge 222, Industry Standard Architecture (ISA) bus 223, and various I/O devices 225.

Generally, each bus utilizes an independent set of protocols (or rules) to conduct data (e.g., the PCI local bus specification and the AGP interface specification). These protocols are designed into a bus directly and such protocols are commonly referred to as the "architecture" of the bus. In a data transfer between different bus architectures, data being transferred from the first bus architecture may not be in a form that is usable or intelligible by the receiving second bus architecture. Accordingly, communication problems may occur when data must be transferred between different types of buses, such as transferring data from a PCI device on a PCI local bus to a CPU on a system bus. Thus, a mechanism is developed for "translating" data that are required to be transferred from one bus architecture to another. This translation mechanism is normally contained in a hardware device in the form of a bus-to-bus bridge (or interface) through which the two different types of buses are connected. This is one of the functions of AGP-enabled Northbridge 204, in that it is to be understood that it translates and coordinates between the various data buses which communicate through AGP-enabled Northbridge 204.

It has been explained previously that in order to give the illusion of motion, it is common to display at least 30 images a second. In 3D continuous-animation computer graphics this is usually done by creation of a sequence of entire frames (or discrete computer screen images) in local frame buffer 212 memory, which are then displayed in sequence on display device 210. The creation of frames must be at such a rate that at least 20 (but preferably 30) different frames can be displayed every second.

Note that display device 210 shows two 3D animated objects, cube 222 shown as being composed of a mosaic of stones 221 and pyramid 224 shown as being composed of number of bricks 223. Cube 222 and pyramid 224 are shown as having a given rate and direction of rotation 225, 227, respectively. Also shown is a stationary 3D object, single light source 230, which is shining upon cube 224 and pyramid 226.

Since texturing is being utilized, the gross shape of cube 222 is described by both a 3D geometric object (most likely a simple geometric cube) and associated texture maps (typically bit mapped images) depicting the mosaic of stones 221 for each side of the 3D geometric object (as shown, it is assumed that the 3D geometric object data and the associated texturing data for cube 222 have been previously read into system memory 216 from a storage unit (not shown)). Since cube 222 is to be portrayed in motion, CPU 214 first retrieves the 3D geometric object data describing cube 222 from system memory 216, and performs a geometric transformation upon the data consistent with the last computed position, and defined trajectory and/or rate and direction of rotation 225 of cube 222, and thereafter caches (cache not shown) the transformed 3D geometric object data. Thereafter, CPU 214 retrieves the texturing data associated with the 3D object representative of cube 222, and computes the appropriate transformation of the texturing data consistent the newly computed/translated 3D geometric object position and lighting source 230. Thereafter, CPU 214 places both the translated 3D object data and the associated transformed texturing data for cube 222 into system memory 216. Subsequently, CPU 214 informs AGP-enabled graphics controller 200 that the translated 3D object data and the associated transformed texturing data for cube 222 are ready in system memory 216. In response, AGP-enabled graphics controller 200, via AGP interconnect 202, requests that AGP-enabled Northbridge 204 retrieve the translated 3D data and associated transformed texturing data for cube 222 from system memory 216. Thereafter, AGP-enabled Northbridge 204 will sequentially retrieve both the translated 3D geometric data and the associated transformed texturing data for the 3D geometric object from system memory 216 and deliver it to AGP-enabled graphics controller 200 via AGP interconnect 202. Thereafter, AGP-enabled graphics controller 200 utilizes the 3D geometric object data and the associated texturing data to create a representation of cube 222, which is subsequently located into the correct location within local frame buffer 212.

Notice that in order to create just one frame of data such as that (i.e., containing cube 222, pyramid 224, and light source 230) depicted within display device 210, the foregoing series of operations for cube 222 (calculating a next geometric position for a 3D object, thereafter adjusting texture data given the next-computed geometric position and lighting source 230, transferring such 3D object and associated texturing data to AGP-graphics controller 200, combining the data to get a correct 3D object, and transferring the object to local frame buffer 212) must be repeated for pyramid 224 since pyramid 224 is to be depicted with rate and direction of rotation 227 (i.e., since pyramid 224 is to be animated). Furthermore, the 3D geometric data and associated texture map for light source 230 must also be retrieved by AGP-enabled graphics controller via communication with AGP-enabled Northbridge 204 and over AGP interconnect 202, and subsequently be loaded into its appropriate coordinates in local frame buffer 212. All objects now present in local frame buffer 212, the frame is now complete and subsequently transferred out of local frame buffer 212, and presented upon display device 210. Notice that, just for this one frame of data, each animated object cube 222 and pyramid 224 required at least two separate computations: one for translating geometric position and the other for transforming the texture data. Furthermore, for each object in motion, such translated geometric data and associated texturing data must ultimately reach AGP-enabled graphics controller 200, which as has been shown, requires multiple data transfers over multiple buses. From this it can be seen that computation and data transfer for 3D continuous-animation computer graphics can become significant factors for frames having tens, hundreds, or more animated objects.

Those skilled in the art will recognize that prior to the advent of the AGP interface standards, virtually all 3D geometric object and associated texturing data had to travel to a graphics controller over PCI bus 218, which was the significant limiting factor in creating realistic 3D continuous-animation graphics using texturing. Those skilled in the art will also recognize that an increase in 3D realism is generally accomplished by increased resolution of the bit-mapped images used to provide the texture for the 3D geometric shapes, but that such increased resolution gives rise to significantly increased computational and data transfer needs. As demonstrated, the AGP interface standard has been designed to remedy the PCI local bus bottleneck by creating a direct data transfer route between AGP-enabled graphics controller 200 and system memory 216, which allows higher data flow rates. The AGP interface standard also has the concomitant benefit of off loading the PCI local bus 218, since it no longer serves as the primary data for graphics data.

The AGP interface standard specifically allows devices such as AGP-enabled graphics controller 200 to access AGP memory "as if" it were contiguous, while in fact much of the memory allocated for 3D geometry and textures may be in disjointed areas of system memory (the AGP interface standard provides for the dynamic allocation (and disallocation) of system memory 216 for graphics on an as-needed basis, which frees up system resources when such resources are not needed for graphics processing). This dynamically allocated memory is substantially always referred to herein using the specific term of art "AGP memory." The AGP interface standard accomplishes the feat of creating the illusion of contiguous memory via defined capabilities of GART system 206, which dynamically communicates and negotiates with an AGP-enabled operating system (not shown) for actual physical system memory 216 locations to be utilized as AGP memory. Thereafter, once the physical memory locations have been assigned, GART system 206 is responsible for translating the virtual memory addresses utilized by devices seeking access to AGP memory, such as AGP-enabled graphics controller 200 into the actual physical memory 216 addresses assigned by the AGP-enabled operating system (not shown), in a fashion that is transparent to AGP-enabled graphics controller 200.

Additional features are also provided by the AGP interface standard. The AGP interface standard requires that all AGP-enabled devices be able to transmit/receive data on both rising and falling clock edges. AGP-enabled graphics controller 200 can pipeline, or continuously transmit, multiple requests for data over AGP interconnect 202, which allows requests for data to be transmitted during the latency period normally experienced during PCI bus memory access. Additionally, the AGP interface standard (currently) provides for 8 extra "sideband" address lines, which will allow AGP-enabled graphics controller 200 to transmit new addresses and requests for data to AGP-enabled Northbridge 204 simultaneously with receiving data in response to a previous request for data on the (current) 32 data/address wires of AGP interconnect 202. If all of the foregoing features of AGP are utilized, it is possible to get a peak data rate of 533 Mbytes/s at 66 MHz. Thus, AGP creates a very high bandwidth data path and gives considerable enhanced 3-D continuous-animation graphics processing capabilities.

The AGP interface standard dictates supported functions and interface standards for AGP-enabled devices; it does not dictate the internal device logic whereby the supported functions are to be implemented, but rather leaves the internal details to the discretion of system designers.

One such device where the internal logic is not dictated is GART system 206. As discussed, GART system 206 is to provide virtual memory address to physical memory address translation in order to allow devices such as AGP-enabled graphics controller 200 to treat AGP memory as if it were one contiguous area in memory, when in fact it may consist of many discontiguous areas of physical memory.

While the internal logic of GART system 206 is not defined under the AGP standard, it is likely that GART system 206 will be implemented by most manufacturers as some variant of the Intel Corporation's x86 CPU Paging Mechanism, which is a 32-bit virtual to physical address translation accomplished through two levels of look up tables: one (the directory) provides a pointer to the location of the base of the appropriate page table, the other (the page table) provides a pointer to the base of a 4 kbyte contiguous physical memory location corresponding to a 4 kbyte page, from which the offset can be used to reach the desired location within the page.

It was explained in the background that the underlying impetus for GART system 206 is to ensure that an AGP-enabled device can access AGP memory "as if" that memory were contiguous, when in actuality the true physical memory may actually be discontiguous when actually assigned by the AGP-enabled operating system. That is, the teaching in the art is that the designer is to assume that the AGP memory dynamically assigned to GART system 206 by the operating system is discontiguous, and that the designer is to design GART system 206 for this eventuality. In point of fact, oftentimes such is not the case. That is, in many instances it could be that the actual physical memory assigned for access by GART system 206 will in fact consist of relatively large chunks of actual contiguous physical system memory 216.

It has been discovered, and such discovery forms an aspect of the inventive content of the present invention, that the fact that such chunks of physically contiguous memory will sometimes be assigned to GART system 206 can be utilized to substantially minimize the processing associated with page table walks through a GART system 206 translation table. Furthermore, such substantial minimization is accomplished in the present invention without incurring any significant costs, should the true physical system memory 216 assigned to GART system 206 actually turn out to be completely discontiguous.

Figure 3:
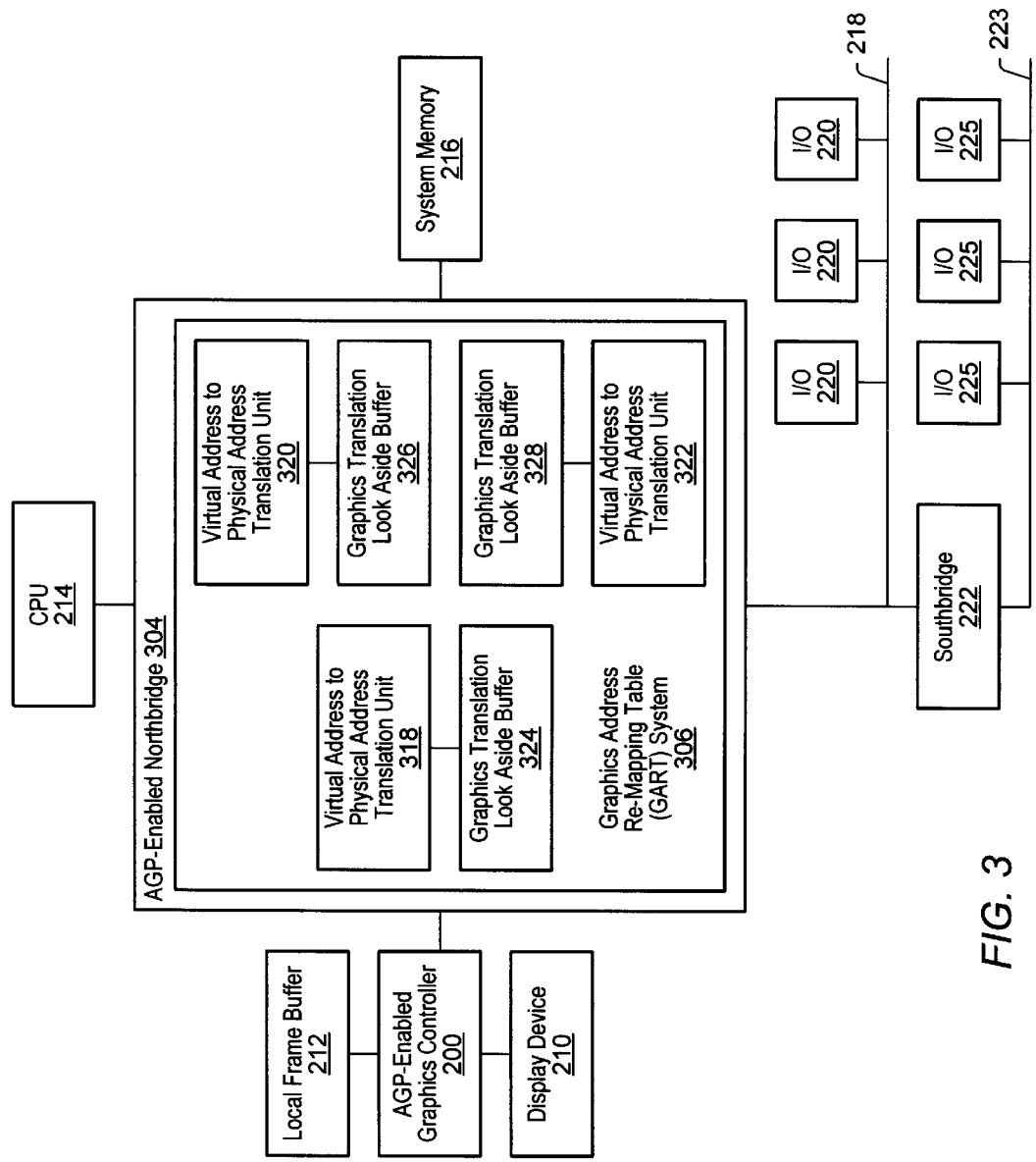
FIG. 3 shows a high-level block diagram depicting an AGP-enabled system which forms an environment wherein one or more embodiments of the present invention may be practiced.

Referring now to FIG. 3, shown is a high-level block diagram depicting an AGP-enabled system which forms an environment wherein one or more embodiments of the present invention may be practiced. Shown are three building blocks of AGP: AGP-enabled graphics controller 200, AGP interconnect 202 (a data bus), AGP-enabled Northbridge 304 (wherein is depicted Graphics Address Resolution Table (GART) system 306). Not shown, but deemed to be present is the fourth building block of AGP: an AGP-enabled operating system (not shown), which provides support for features of the present invention as described below (although those skilled in the art will recognize that some modification of device drivers will be necessary, the AGP-enabled operating system itself will require no modification). The remaining shown components function substantially similar to the like-numbered components described in relation to FIG. 2.

The AGP interface specification requires that all access to AGP memory go through GART device 306; consequently, shown within AGP-enabled Northbridge 304 are virtual address to physical address translation units 318, 320, 322 with which are associated Graphics Translation Look Aside Buffers (GTLBs) 324, 326, 328, respectively.

It was mentioned above that the present invention takes advantage of the fact that an AGP-enabled operating system will most likely return a number of blocks of contiguous physical memory 216 when AGP memory is dynamically created and allocated by the AGP-enabled operating system (exactly how this information is taken advantage of will become apparent below). Each such block of contiguous physical memory 216, allocated by the AGP-enabled operating system as constituting part of AGP memory, will hereinafter be referred to as a Contiguous Graphics (physical) Memory Block (CGMB). In order to take advantage of any CGMBs that may be present, it is necessary to garner and make available certain information. In one embodiment, this information is garnered and made available via a two-level CGMB GART system 306 graphics page table.

Figure 1:
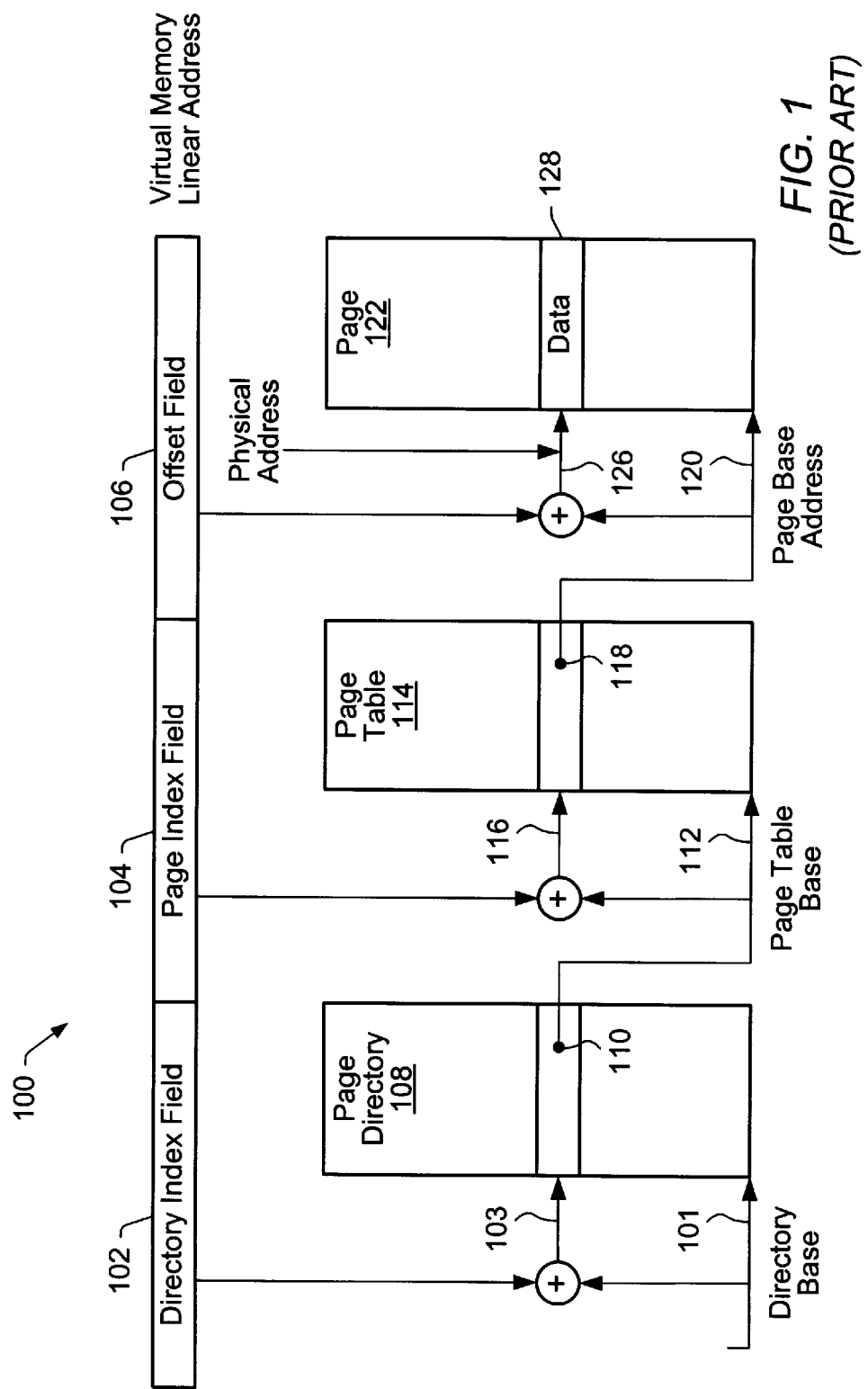
FIG. 1 shows a prior art x86 CPU Paging Mechanism.
Figure 4:
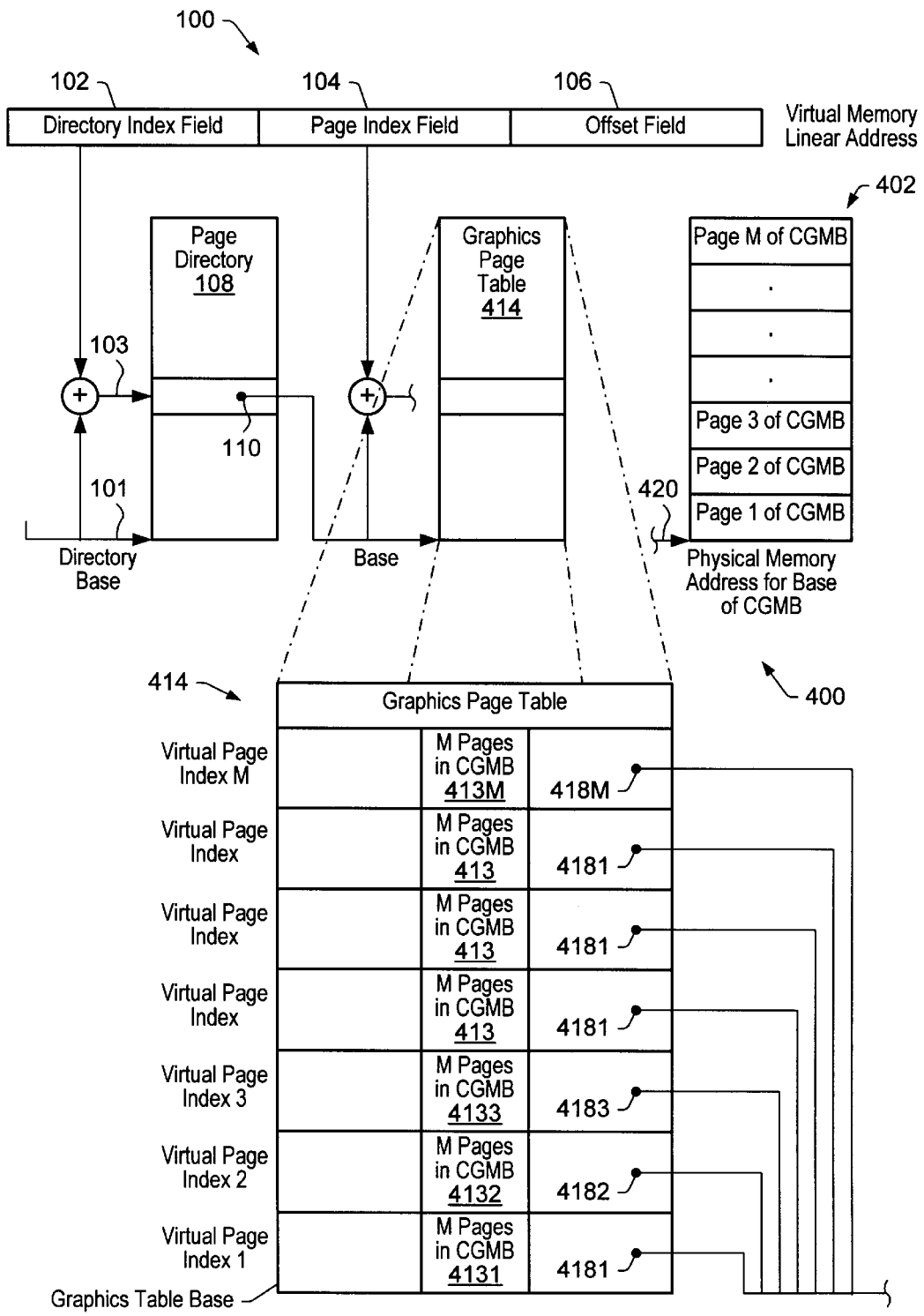
FIG. 4 shows a two-level Continuous Graphics Memory Block (CGMB) Graphics Address Resolution Table (GART) graphics paging mechanism which shows one implementation wherein CGMB information is encoded.

With reference now to FIG. 4, depicted is a two-level CGMB GART graphics paging mechanism 400 which shows one implementation wherein CGMB information is encoded. Like-numbered components of FIG. 4 function in a manner substantially similar to the like-numbered components of FIG. 1. Shown is an exploded view of the level 2 or graphics page table 414. Notice that the contents of graphics page table 414 are substantially different than that described for page table 114 of FIG. 1. In page table 114 physical memory pointer 118 pointed to a unique physical memory page address for each unique page table index 116. Notice that in graphics page table 414, wherein are shown graphics page table 414 indexes ranging from Index 1 to Index M, and with which are associated physical memory pointers 4181–418M, respectively, each physical memory pointer points to the same physical memory location: the physical memory address of the base 420 of the CGMB 402 of which each such pages are members. Furthermore, note that page table 414 has a additional CGMB page fields 4131–413M associated with Index 1 through Index M, respectively, each of which specify the total number of pages (in the example shown, the number of page is "M") within COMB 402. That is, for all virtual memory pages corresponding to a particular CGMB the graphics page table 410 entries for each virtual page would be identical, each containing the number of pages (CGMB page fields 4131–413M) of the whole CGMB and the base of the entire CGMB; such entry being contained in the base field (in physical memory pointers 418I–418M) instead of the base of the specific page. However, in the event that the page is not a part of any CGMB, the page count would be set to 1 page and the base address in the page table would point directly to the page in memory.

The AGP-enabled operating system is responsible for garnering the information about any CGMBs that may be present and constructing CGMB GART paging mechanism 400. In one embodiment, this is accomplished via a Hardware Abstraction Layer (HAL) of an AGP-enabled GTLB-capable operating system (not shown). One (non-exclusive) way in which this could be done would be to have a two-pass processing step during initialization of the CGMB GART paging mechanism 400. The first pass would create GART mapping for each page individually in a two-level page table. The second pass through the page directory and page table structures could be made to identify each CGMB, and to modify the page table entries for pages mapping the CGMBs as described in relation to FIG. 4.

The foregoing described embodiment of CGMB two-level GART paging mechanism 400 is merely illustrative and should not be taken as limiting. Those skilled in the art will understand that many other embodiments wherein the necessary CGMB information is contained are possible, such as ones having fields indicative of the base and apex of the CGMB, and a particular page's relative position therein. Those skilled in the art will also realize that other ways of initializing the two-level GART exist, such as empowering the operating system to appropriately initialize the CGMB GART paging mechanism 400 in one pass. Those skilled in the art will also recognize that a substantially equivalent structure could be achieved by having one physical memory pointer associated with the multiple graphics virtual memory page indexes, instead of multiple duplicates of the same physical memory pointer associated with the multiple graphics virtual memory pages indexes.

As has been shown, the CGMB information has now been encoded. This information is used by various embodiments of the present invention to create a single GTLB entry which can be utilized to translate every virtual memory address correspondent to the CGMB (which may be composed of multiple pages, or areas larger or smaller than a page, of physical memory) without incurring a page table walk. Thus, since in the absence of the present invention a single TLB entry is only capable of translating one page worth of virtual memory addresses, the present invention represents a substantial advance in the art.

Figure 5:
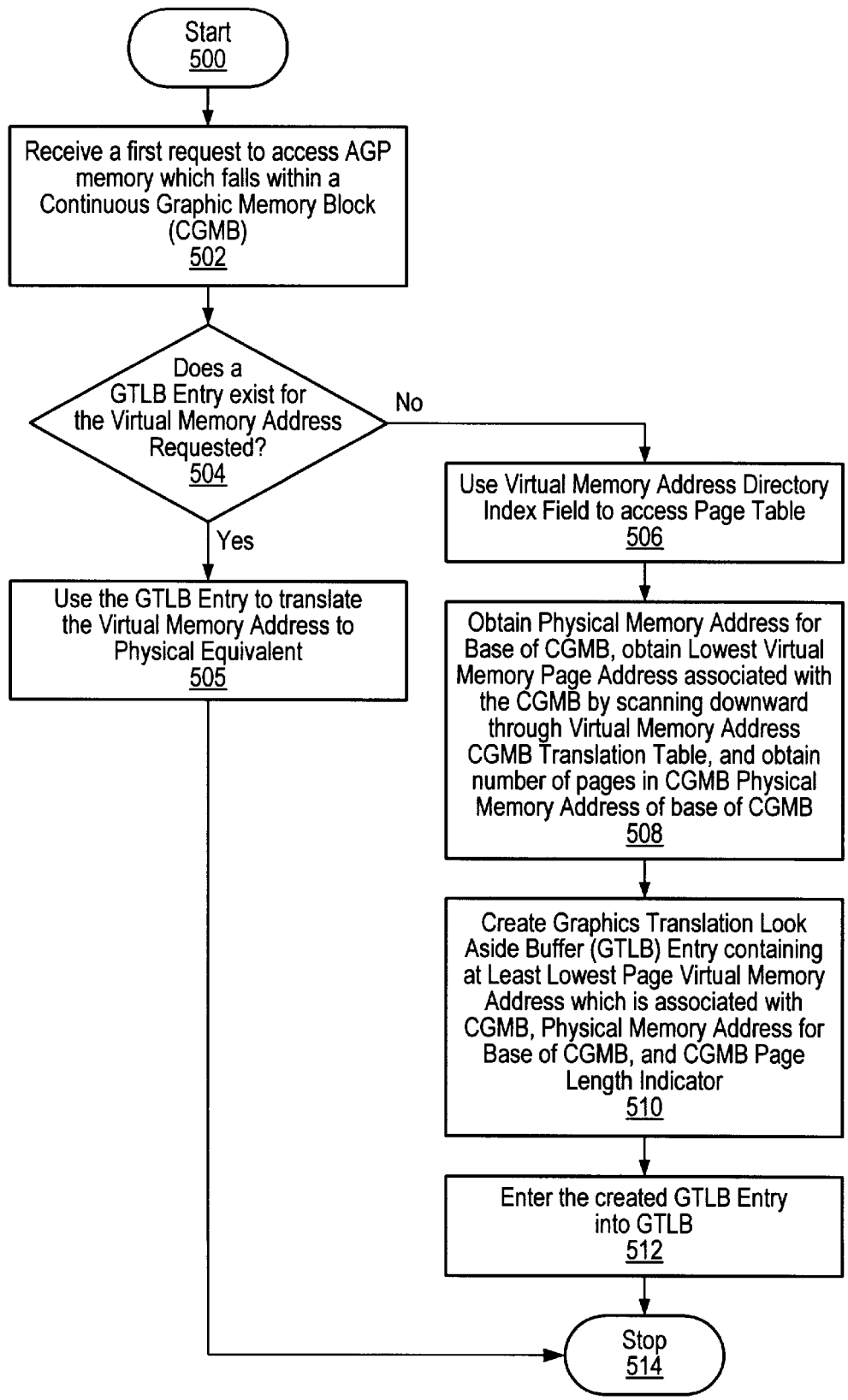
FIG. 5 shows a high-level logic flowchart of the steps involved in creating and storing a Graphics Translation Look Aside Buffer (GTLB) entry.

Referring now to FIG. 5, which is a high-level logic flowchart of the steps involved in creating and storing a GTLB entry, method step 500 shows the start of the process. Method step 502 depicts the receipt by a virtual address to physical address translation unit (e.g., virtual to physical address translation unit 318, 320, or 328) of a request to access an AGP memory page which falls within a Continuous Graphics Memory Block (CGMB). Method step 504 illustrates the determination of whether a GTLB entry exists for the virtual memory address for which access has been requested (how this determination is done is explained in a subsequent figure). In the event that a GTLB entry does exist for the virtual memory address, method step 505 shows the GTLB entry is utilized to translate the virtual memory address to a corresponding physical memory address as will be described in subsequent figures, below. Thereafter, the process proceeds to method step 514 and stops.

In the event that a GTLB entry does not exist for the virtual memory address for which access has been requested, the process proceeds to method step 506, which depicts that the virtual memory address is utilized to access page table 414. Once access to page table 414 has been made, method step 508 illustrates that page table 414 is scanned to determine the physical memory address of the base of the CGMB (or base 420 in FIG. 4), the lowest graphics page table 414 index (Index 1 as shown in FIG. 4, but it actually could be any number index) corresponding to the CGMB for which page table 414 has been constructed (hereinafter referred to as "graphics table base"), and the number of pages in the CGMB (or M pages, as shown in FIG. 4). Thereafter, method step 510 shows the creation of a GTLB entry having at least the lowest page table index corresponding to the CGMB for which page table 414 has been constructed (i.e., the "graphics table base"), the number of pages in the CGMB, and the physical memory address of the base of the CGMB. Subsequently, method step 512 shows that the GTLB entry is entered into a GTLB (e.g., GTLB 320, 324, or 328), after which the process proceeds to method step 514 and stops.

Figure 6:
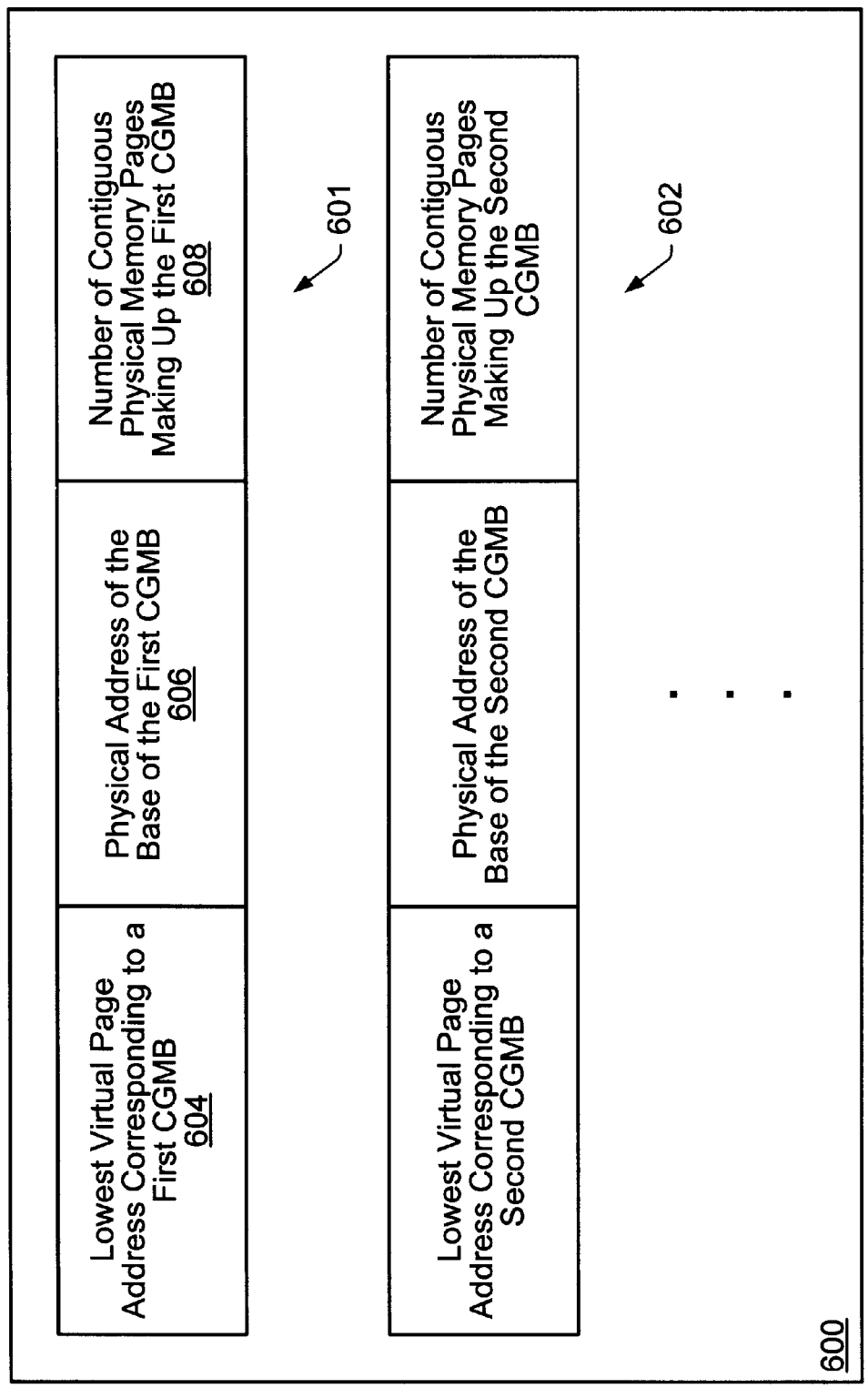
FIG. 6 shows a GTLB containing an embodiment of a GTLB entry which can be utilized to substantially minimize page table walks.

Referring now to FIG. 6, illustrated is a GTLB 600 for which access has been requested containing an embodiment of GTLB entries 601, 602 which can be utilized to substantially minimize page table walks. GTLB 600 is shown having GTLB entry 601 (with GTLB entry 602 and the following ellipses intended to show that several more than one GTLB entry is likely be present within GTLB 600), with each GTLB entry 601, 602 having at least the following fields: lowest virtual page 20 address corresponding to a particular CGMB's base (i.e., "graphics table base"), that same particular CGMB's base physical address, and the number of contiguous pages constituting that same particular CGMB. Specifically, GTLB entry 601 is shown as having at least the following fields: graphics table base (lowest virtual page address corresponding to a first CGMB base) field 604; a first CGMB base physical address field 606, and number of contiguous pages constituting that first CGMB field 608. It has been shown that the GTLB creation logic scans graphics page table 414 to find the lowest virtual page address in graphics table 414 corresponding to the base address of the CGMB of which that virtual page is a member. By making the lowest virtual page address corresponding to the base address of the CGMB of which that virtual page is a member the "graphics table base", an increase in the page number relative to the graphics table base will equate to an increase in pages relative to the CGMB base.

Figure 7:
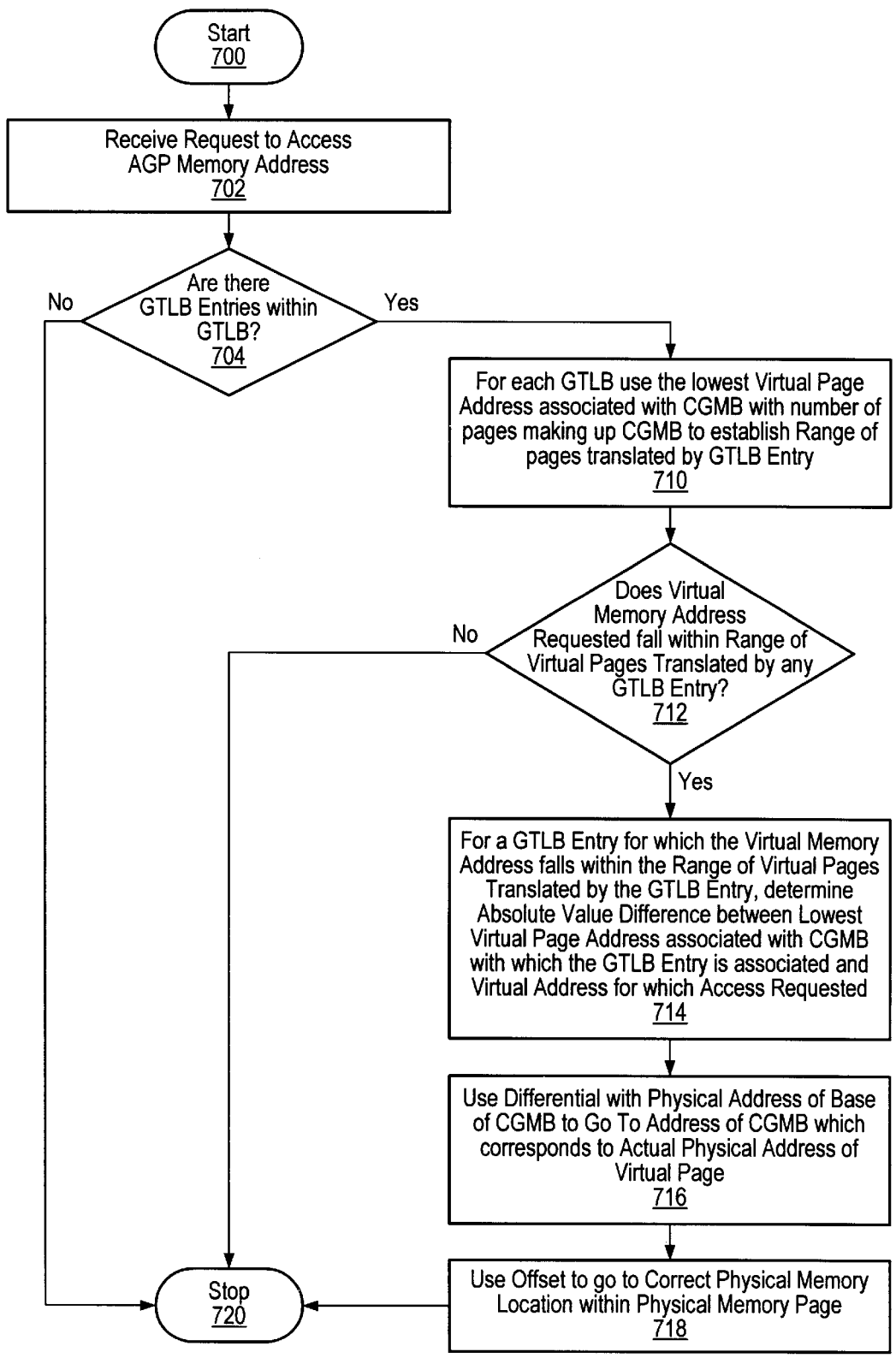
FIG. 7 shows a high-level block diagram of a first embodiment where a GTLB entry of FIG. 6 is utilized to accomplish virtual memory address to physical memory address translation.

Referring now to FIG. 7, shown is a high-level block diagram of a first embodiment depicting how GTLB entries (e.g., such as GTLB entry 601) can be utilized to accomplish virtual memory address to physical memory address translation. Method step 700 shows the start of the process. Method step 702 depicts the receipt of a request to access an AGP memory address. Method step 704 illustrates the determination of whether there are one or more GTLB entries in the GTLB. If not, the process proceeds to method step 720 and stops. However, if GTLB entries are present the process proceeds to method step 710.

Method step 710 shows that for each GTLB entry in the GTLB, the field containing the lowest virtual page address corresponding to a specific CGMB base (i.e. the graphics table base) is used along with the field containing the CGMB number of pages in order to determine a range of virtual pages translated by each such GTLB entry. Method step 712 depicts that a determination is made as to whether the virtual page to be accessed falls within the range of virtual pages translated by any of the GTLB entries. In the event that the virtual page to be accessed does fall within a range of virtual pages translated by a GTLB entry, method step 714 shows that for a GTLB entry where the virtual page to be accessed falls within the range of pages translated by that GTLB entry, the absolute value difference between the lowest virtual page address corresponding to the CGMB base (e.g., contained within graphics table base field 604) and the virtual page address for which access has been requested (e.g., contained within page index field 104) is calculated. Method step 716 depicts that this differential is then utilized with the physical address of the CGMB base (e.g., contained within CGMB base physical address field 606) to go to the appropriate address in physical memory correspondent to the virtual page for which access is sought (this occurs because the lowest virtual page address has been equated to the CGMB base located physical memory, and thus the increases in virtual memory pages and CGMB physical memory pages will track one-to-one). Thereafter, method step 718 illustrates that the offset (contained within offset field 106) can be utilized in normal fashion to go to the correct location within the page of physical memory within the CGMB. Method step 720 shows the end of the process.

In the event that the inquiry of method step 712 indicates that the virtual memory page to be accessed does not fall within the range of virtual pages translated by any of the GTLB entries, the process proceeds to method step 720 and stops.

There are numerous specific embodiments wherein the contents of GTLB 600 can be utilized to perform translation for a range of virtual addresses. One such embodiment is demonstrated by way of example in FIGS. 8A and 8B. In this embodiment, it is required that the CGMBs be specified as only being composed of $2^n$ (where n is some non-negative integer) numbers of pages. By requiring that the CGMBs only be composed of $2^n$ (where n is some non-negative integer) numbers of pages, the comparison operation can be implemented in one stage using a variable size mask. For each doubling of the number of pages, one less bit of address in lowest virtual page address corresponding to CGMB base field 604, and CGMB physical address field 606, are used.

Figure 8A:
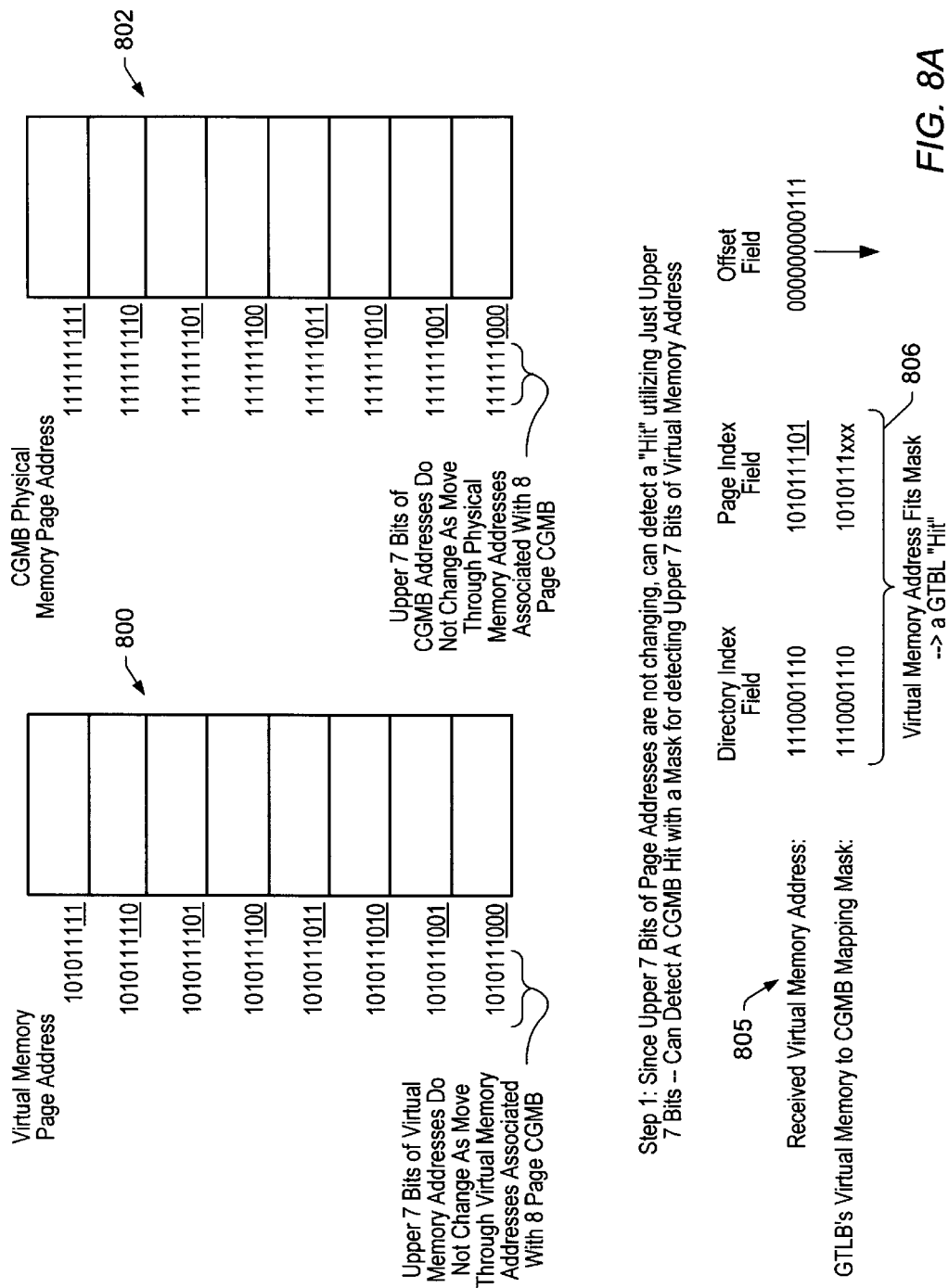

Referring now to FIGS. 8A and 8B, there is illustrated, via example, how a second embodiment takes advantage of GTLB entries to translate virtual addresses to physical addresses. The example is broken down into two main steps. In the first step, determination is made as to whether a virtual address can be translated by a current GTLB entry. In the second step, the actual physical memory address is located.

With reference now to FIGS. 8A and 8B, which constitute a high-level pictographic representation of an embodiment of the present invention, shown are virtual memory page address block 800 and CGMB physical memory page address block 802. FIG. 8A shows that a determination is made as to whether a given virtual address can be translated by a GTLB entry. The situation depicted with respect to virtual memory page address block 800 and CGMB physical memory page address block 802 is assumed to be that subsequent to the creation of a CGMB and the subsequent coordination of a contiguous block of graphics virtual memory addresses with the created CGMB.

Shown is that virtual memory page address block 800 has virtual memory page addresses ranging from 1010111000 through 1010111111 contiguous virtual page addresses. Further shown is that CGMB physical memory page address block 802 heads physical memory page addresses ranging from 1111111000 through 1111111111 contiguous physical memory page addresses.

Depicted is that the CGMB physical memory page address 802 has been created such that it has 8 pages of contiguous physical memory; accordingly, shown is that virtual memory page address block 800 also has 8 pages of contiguous virtual memory addresses which have been coordinated with the CGMB physical memory page address block 802. As has been discussed, in this embodiment the number of pages should be such that it is equal to the count of a series of bits. For example, shown in FIG. 8A is that the number of contiguous memory pages is 8, which coordinates with the maximum count that can be achieved with three bits (i.e., as has been discussed the allowable page link of any CGMB must be a power of 2), and both the virtual memory page address block 800 and the CGMB physical memory page address block 802 should begin with addresses wherein the number of bits necessary to count the pages are all 0. For example, as shown in FIG. 8A blocks 800, 802 have eight pages; consequently, as shown, the lowest three bits of the virtual and physical memory page addresses are those bits necessary to completely characterize such memory blocks, and it is necessary for such lowest three bits to begin as all zeros (i.e. with the bit sequence "000").

Depicted is that since the contiguous addresses of virtual memory page address block 800 and CGMB physical memory page address block 802 can be characterized by the three lowest bits of the virtual and physical page addresses, it is known that the upper seven bits of the virtual and physical page addresses associated with the CGMB remain constant (i.e., do not change) as procession and is made through either the virtual memory page address block 800 or the CGMB physical memory page address block 802. This fact is utilized by one embodiment of the invention to allow a GTLB to detect a GTLB hit for a GTLB entry utilizing a relatively straightforward masking procedure.

Illustrated in what is referenced to as "step 1," is that since the upper seven bits of the page addresses for both the virtual memory pages and the CGMB physical memory pages are constant for the constructed CGMB, this fact can be utilized to detect a CGMB hit for a particular entry in a GTLB. This is shown via example wherein is depicted that a virtual memory linear address 805 (analogous to virtual linear memory address 100) is received. Shown is that a GTLB virtual memory address to CGMB mapping mask 806 is applied to received virtual memory linear address 805, except for the offset field bits which flow through with no comparisons.

Depicted is that received virtual memory linear address 805 fits the GTLB virtual memory address to CGMB mapping mask 806, which results in a GTLB "hit," which means that the virtual memory request can be resolved without resort to a page table walk.

Since the utilization of the GTLB virtual memory to CGMB mapping of mask 806 resulted in a GTLB "hit," it is now known that the virtual memory location requested via received virtual memory linear address 805 resides within CGMB physical memory page address 802. Consequently, the as-yet-unused bits of the page index field of received virtual memory address 805 can now be utilized to locate the appropriate page within CGMB physical memory page address 802 1111111101 corresponding to be requested virtual memory page address: 10010111101. This operation is depicted within FIG. 8B.

Illustrated in what is shown as "step 2" is that since "step 1" resulted in a GTLB hit, the CGMB base physical memory address can be utilized in conjunction with the as-yet-unused virtual memory page address bits of received virtual memory address 805 to locate the correct physical memory page, correspondent to the requested virtual memory page, within the CGMB physical memory block 802.

With reference now to FIG. 8B, shown is that the as-yet-unused virtual memory page address bits are selected out by use of a second mask: GTLB virtual memory page to CGMB page mask 808, which "selects out" the as-yet-unused virtual memory page address bits "101." Thereafter depicted is that the "selected out" bits are appended to the "unchanging" upper seven bits of the CGMB physical memory page addresses to construct the correct CGMB page address correspondent to the requested virtual memory page address; equivalently, as is shown in FIG. 8B this operation can be achieved by replacing the "changing" portion of the CGMB base physical memory address with the "selected out" virtual memory page address bits to achieve the same effect.

As is shown in FIG. 8B, the foregoing described operations have now resulted in the Correct CGMB physical memory page address 810. Consequently, the offset field of the received virtual memory linear address can now be utilized, as is ordinary and customary, to access the correct memory location within the CGMB page indicated by the constructed CGMB page address 810.

The foregoing detailed description set forth various embodiments of the present invention via the use of block diagrams, flowcharts, and examples. It will be understood as notorious by those within the art that each block diagram component, flowchart step, and operations and/or components illustrated by the use of examples can be implemented, individually and/or collectively, by a wide range of hardware, software, firmware, or any combination thereof. In one embodiment, the present invention is implemented via Application Specific Integrated Circuits (ASICs). However, those skilled in the art will recognize that the embodiments disclosed herein, in whole or in part, can be equivalently implemented in standard Integrated Circuits, as a computer program running on a computer, as firmware, or as virtually any combination thereof.

Notice that the foregoing described embodiments have the advantage of creating a TLB which will map an entire CGMB space after only one access of one virtual memory that mapped within the CGMB. As has been discussed, in the absence of the present invention, TLBs are only created and can be used to translate virtual memory locations correspondent to one, previously accessed, physical memory page. Accordingly, the present invention affords a tremendous advantage over the prior art, and the advantage will increase correspondent with the size of the CGMBs that happen to appear.

An alternative GTLB embodiment is also envisioned. In the alternative embodiment, the CGMBs will not be constrained to $2^n$ (where n is some non-negative integer) numbers of pages. In this alternative embodiment, the GTLB entry will again consist of a lowest virtual page address correspondent to the CGMB base physical address, and the CGMB base physical address. However, also present will be a length field, which will specify the number of contiguous pages making up the CGMB. In this implementation, the translation engine would have to be further modified to determine whether a virtual address fell within a the page range spanned by the CGMB. If it was so determined, the difference in the new virtual page address and the virtual page address contained within the GTLB could then be utilized to determine the appropriate page as referenced against the base of the CGMB. Thereafter, the offset could be utilized as normally.

Other Embodiments

While particular embodiments of the present invention have been shown and described, it will be obvious to those skilled in the art that, based upon the teachings herein, changes and modifications may be made without departing from this invention and its broader aspects.

For example, while the components discussed above have been described as local to a GART device, it will be appreciated that the distinctions location of the functions are somewhat arbitrary and that the functions described within those circuits may be embodied within a number of different locations. Accordingly, the presence and location of any described functions are not intended to be limiting.

Also for example, while various bus architectures are described as coupling various components, it will be appreciated that any type of bus architecture having virtual memory to address memory translation, such as that occurring within the paging units of most processors as described above, would be improved by the present invention. Accordingly, the described architectures are not intended to be limiting.

An additional option would be to force the granularity of the CGMBs to be a power of two so that instead of the lower 12 bits we could use the lower 13, 14, or 15 bits (and so on) as an offset to the CGMB base address retrieved from the page table.

Other embodiments are within the following claims.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the present invention is defined solely by the appended claims

What is claimed is:

1. A method comprising:
   in response to receiving a first request to access a first memory location identified by a first virtual address, translating the first virtual address to a first physical address, wherein said translating the first virtual address comprises retrieving information from a single entry included in a lookup table, and wherein the first memory location is included in a first page of memory locations;
   caching the information retrieved from the single entry included in the lookup table in a first entry in a translation lookaside buffer;
   in response to receiving a second request to access a second memory location identified by a second virtual address, translating the second virtual address to a second physical address, wherein said translating the second virtual address comprises accessing the information cached in the first entry in the translation lookaside buffer, wherein the same information used to translate the first virtual address is used to translate the second virtual address, wherein the second memory location is included in a second page of memory locations, wherein the first page is different from the second page.

2. The method of claim 1, wherein said retrieving information from the lookup table comprises retrieving a lowest physical base address of a plurality of contiguous pages of memory locations.

3. The method of claim 2, wherein said retrieving comprises retrieving a lowest virtual base address corresponding to the lowest physical base address of the plurality of contiguous pages.

4. The method of claim 3, wherein said caching the information further includes caching the lowest physical base address, a number of contiguous pages included in the plurality of contiguous pages of memory locations, and the lowest virtual base address.

5. The method of claim 1, further comprising receiving the first request from a graphics controller, wherein the first memory location is included in a plurality of memory locations allocated as AGP (Advanced Graphics Port) memory.

6. The method of claim 1, further comprising detecting whether an entry in the translation lookaside buffer exists for the first virtual address and retrieving the information from the lookup table if the entry does not exist for the first virtual address.

7. The method of claim 6, wherein said detecting comprises:
detecting a range of a plurality of virtual pages to which information stored in the entry of the translation lookaside buffer corresponds; and
detecting whether the first virtual address falls within the range of the plurality of virtual pages.

8. The method of claim 6, wherein said detecting comprises comparing a first portion of a plurality of bits included in the first virtual address with a first portion of a plurality of bits included in a lowest virtual base address associated with a plurality of virtual pages to which information stored in the entry of the translation lookaside buffer corresponds.

9. A method comprising:
in response to receiving a first request to access a first memory location identified by a first virtual address, translating the first virtual address to a first physical address, wherein said translating the first virtual address comprises retrieving information from a lookup table, and wherein the first memory location is included in a first page of memory locations;
caching the information retrieved from the lookup table in a first entry in a translation lookaside buffer;
in response to receiving a second request to access a second memory location identified by a second virtual address, translating the second virtual address to a second physical address, wherein said translating the second virtual address comprises accessing the information cached in the first entry in the translation lookaside buffer, wherein the second memory location is included in a second page of memory locations, wherein the first page is different from the second page;
wherein said translating the second virtual address comprises calculating an absolute value difference between the second virtual address and a lowest virtual base address indicated by the information cached in the first entry.

10. The method of claim 9, wherein said translating comprises calculating a physical base address of the second page of memory locations from the absolute value difference and a lowest physical base address indicated by the information cached in the first entry.

11. A computer system comprising:
a system memory configured to store a lookup table, wherein each entry in the lookup table corresponds to a single page of memory locations, wherein a first entry and a second entry included in the lookup table each store an indication of a number of pages included within a plurality of contiguous pages of memory locations;
a translation lookaside buffer comprising one or more entries wherein a first entry of the one or more entries indicates a first physical base address associated with the plurality of contiguous pages of memory locations;
a virtual-to-physical address translation unit coupled to access the lookup table in the system memory and coupled to access the translation lookaside buffer;
wherein the virtual-to-physical address translation unit is configured to access the lookup table when translating virtual addresses that miss in the translation lookaside buffer and to access the first entry in the translation lookaside buffer when translating a first virtual address and a second virtual address, wherein the first virtual address maps to a first page within the plurality of contiguous pages, wherein the second virtual address maps to a second page within the plurality of contiguous pages.

12. The computer system of 11, wherein the first entry in the lookup table is associated with the first page of the plurality of pages and stores information indicative of the first physical base address of the plurality of contiguous pages, wherein the second entry in the lookup table is associated with the second page and also stores the information indicative of the first physical base address.

13. The computer system of claim 11, wherein the virtual-to-physical address translation unit is configured to translate a third virtual address to a third physical address by retrieving information stored in a first entry included in the lookup table, wherein the third physical address is comprised in a third page of memory locations, wherein the information comprises a lowest physical base address of a second plurality of contiguous pages of memory locations, wherein the third page is included in the second plurality of contiguous pages.

14. The computer system of claim 13, wherein the information in the first entry included in the lookup table comprises a number of pages included within the second plurality of contiguous pages of memory locations.

15. The computer system of claim 14, wherein the information in the first entry included in the lookup table comprises a lowest virtual base address corresponding to the lowest physical base address of the second plurality of contiguous pages.

16. The computer system of claim 15, wherein the virtual-to-physical address translation unit is configured to cache the lowest physical base address, the number of pages, and the lowest virtual base address in a second entry of the one or more entries included in the translation lookaside buffer.

17. The computer system of claim 11, wherein the virtual-to-physical address translation unit is configured to receive a first request to access a memory location identified by the first virtual address from a graphics controller, wherein the first memory location is included in a plurality of memory locations allocated as AGP (Advanced Graphics Port) memory.

18. The computer system of claim 11, wherein the virtual-to-physical address translation unit is configured to detect whether one of the one or more entries in the translation lookaside buffer corresponds to the first virtual address and to access the lookup table if none of the one or more entries correspond to the first virtual address.

19. The computer system of claim 18, wherein the virtual-to-physical address translation unit is configured to detect whether the first entry corresponds to the first virtual address by detecting a range of a plurality of virtual pages to which information stored in the first entry corresponds and detecting whether the first virtual address falls within the range of the plurality of virtual pages.

20. The computer system of claim 18, the virtual-to-physical address translation unit is configured to detect whether the first entry corresponds to the first virtual address by comparing a first portion of a plurality of bits included in the first virtual address with a first portion of a plurality of bits included in a lowest virtual base address associated with a plurality of virtual pages to which information stored in the first entry corresponds.

21. A computer system comprising:
a system memory configured to store a lookup table, wherein each entry in the lookup table corresponds to a single page of memory locations;
a translation lookaside buffer comprising one or more entries, wherein a first entry of the one or more entries indicates a first physical base address associated with a plurality of contiguous pages of memory locations;
a virtual-to-physical address translation unit coupled to access the lookup table in the system memory and coupled to access the translation lookaside buffer;
wherein the virtual-to-physical address translation unit is configured to access the lookup table when translating virtual addresses that miss in the translation lookaside buffer and to access the first entry in the translation lookaside buffer when translating a first virtual address and a second virtual address, wherein the first virtual address maps to a first page within the plurality of contiguous pages, wherein the second virtual address maps to a second page within the plurality of contiguous pages;
wherein the lookup table includes a first entry and a second entry, wherein the first entry is associated with the first page of the plurality of pages and stores information indicative of a base and an apex of the plurality of contiguous pages.

22. The computer system of claim 21, wherein the first entry stores information indicative of a relative position of the first page within the plurality of contiguous pages.

23. A computer system comprising:
a system memory configured to store a lookup table, wherein each entry in the lookup table corresponds to a single page of memory locations;
a translation lookaside buffer comprising one or more entries, wherein a first entry of the one or more entries indicates a first physical base address associated with a plurality of contiguous pages of memory locations;
a virtual-to-physical address translation unit coupled to access the lookup table in the system memory and coupled to access the translation lookaside buffer;
wherein the virtual-to-physical address translation unit is configured to access the lookup table when, translating virtual addresses that miss in the translation lookaside buffer and to access the first entry in the translation lookaside buffer when translating a first virtual address and a second virtual address, wherein the first virtual address maps to a first page within the plurality of contiguous pages, wherein the second virtual address maps to a second page within the plurality of contiguous pages;
wherein the virtual-to-physical address translation unit is configured to translate the second virtual address by calculating an absolute value difference between the second virtual address and a lowest virtual base address indicated by information stored in the first entry.

24. The computer system of claim 23, wherein the virtual-to-physical address translation unit is configured to calculate a physical base address of the second page from the absolute value difference and the first physical base address.

25. A computer system comprising:
a lookup table comprising a plurality of entries, wherein each entry corresponds to a single page of memory locations;
a translation lookaside buffer comprising a first entry, wherein the first entry corresponds to a plurality of pages of memory locations;
an address translation unit coupled to the lookup table and the translation lookaside buffer, wherein the address translation unit is configured to retrieve information from one of the plurality of entries in the lookup table in order to translate a first virtual address to a first physical address wherein the information identifies how many pages are included in a plurality of contiguous pages of memory locations, wherein the first physical address is included in a first page of the plurality of contiguous pages, and wherein the address translation unit is configured to cache the information retrieved from the one of the plurality of entries in the first entry of the translation lookaside buffer;
wherein the address translation unit is configured to access the information cached in the first entry to translate a second virtual address to a second physical address, wherein the second physical address identifies a second memory location in a second page of the plurality of contiguous pages.

26. A computer system comprising:
system memory comprising a plurality of pages of memory locations allocated as AGP (Advanced Graphics Port) memory;
an AGP-enabled graphics controller configured to assert requests to access memory locations included in the plurality of pages of memory locations, wherein a first request to access data stored in a first page of the plurality of pages specifies a first virtual address, wherein a second request to access data stored in a second page of the plurality of pages specifies a second virtual address, wherein the second page is different from the first page;
an AGP-enabled Northbridge coupled to the system memory and the AGP enabled graphics controller, wherein the AGP-enabled Northbridge includes a translation lookaside buffer comprising a plurality of entries, wherein the AGP-enabled Northbridge is configured to store information retrieved from a single entry in a lookup table in a first entry of the plurality of entries in response to translating the first virtual address to a first physical address identifying a first memory location within the first page; wherein the AGP-enabled Northbridge is configured to access the same information stored in the first entry when translating the second virtual address to a second physical address identifying a second memory location within the second page.

27. A computer system comprising:
a lookup table comprising a plurality of lookup table entries, wherein a first portion of the plurality of lookup table entries each correspond to a respective page within a plurality of contiguous pages of memory locations, wherein each of the first portion of the plurality of lookup table entries stores a same value, wherein the same value identifies how many pages are included in the plurality of contiguous pages;

a translation lookaside buffer comprising a plurality of entries, wherein a first entry of the plurality of entries corresponds to the plurality of contiguous pages of memory locations; and an address translation unit configured to access the lookup table when translating virtual addresses that miss in the translation lookaside buffer and to access the first entry when translating virtual addresses that map to physical addresses of memory locations within the plurality of contiguous pages of memory locations.

28. A method comprising:

in response to receiving a first request to access a first memory location identified by a first virtual address, translating the first virtual address to a first physical address, wherein said translating the first virtual address comprises retrieving information from a single entry included in a lookup table, wherein the information includes information indicative of a base and an apex of a plurality of contiguous pages of memory locations, and wherein the first memory location is included in a first page of memory locations;

caching the information retrieved from the lookup table in a first entry in a translation lookaside buffer;

in response to receiving a second request to access a second memory location identified by a second virtual address, translating the second virtual address to a second physical address, wherein said translating the second virtual address comprises accessing the information cached in the first entry in the translation lookaside buffer, wherein the second memory location is included in a second page of memory locations, wherein the first page is different from the second page.

* * * * *